July 24, 1956    J. W. CAUFFMAN    2,756,101
FIRE HOSE RACK
Filed May 3, 1954    2 Sheets-Sheet 1
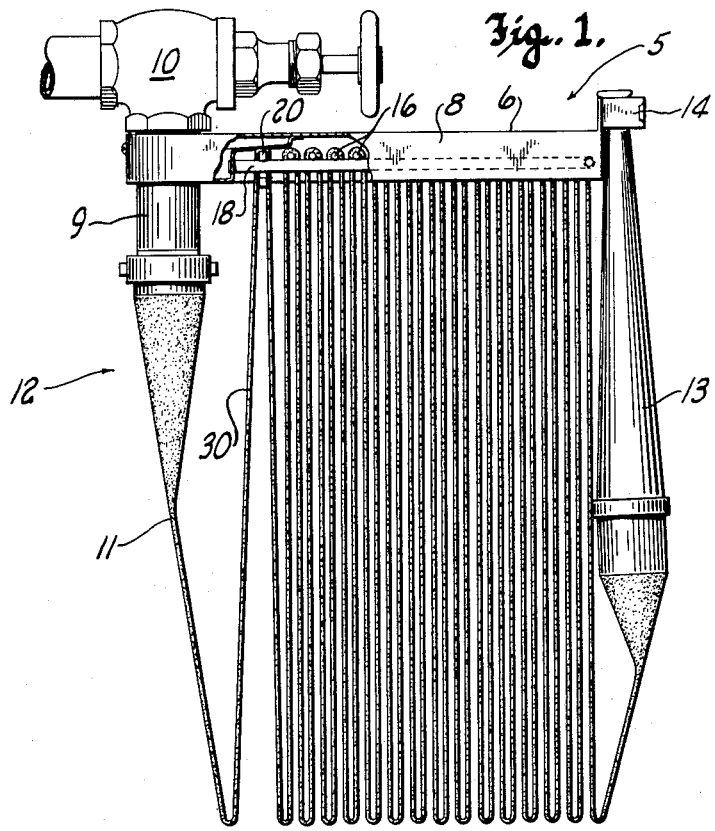
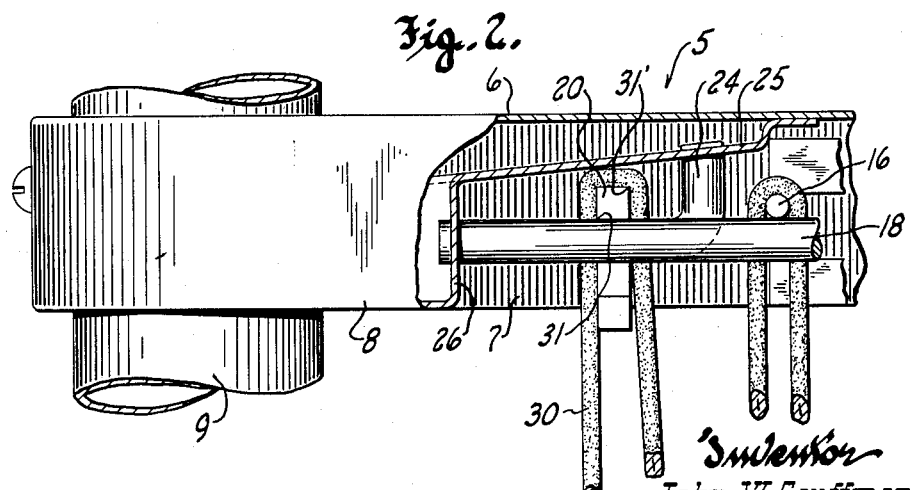
Inventor
John W. Cauffman July 24, 1956     J. W. CAUFFMAN     2,756,101
FIRE HOSE RACK
Filed May 3, 1954                        2 Sheets-Sheet 2
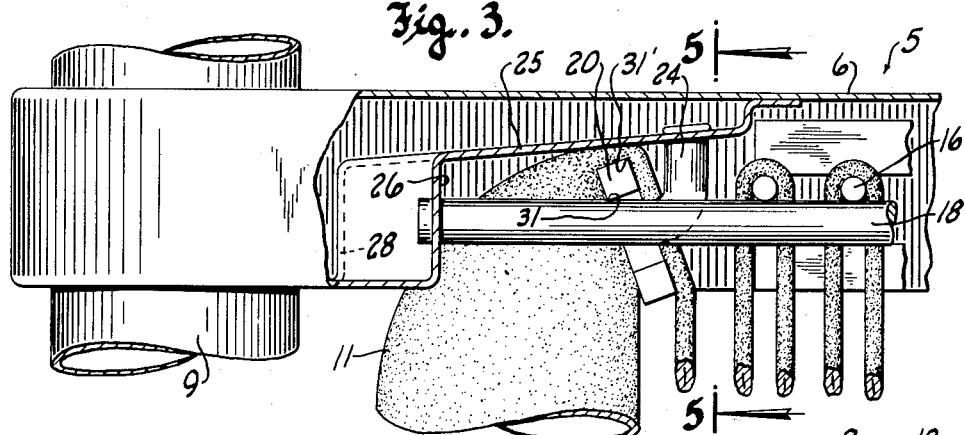
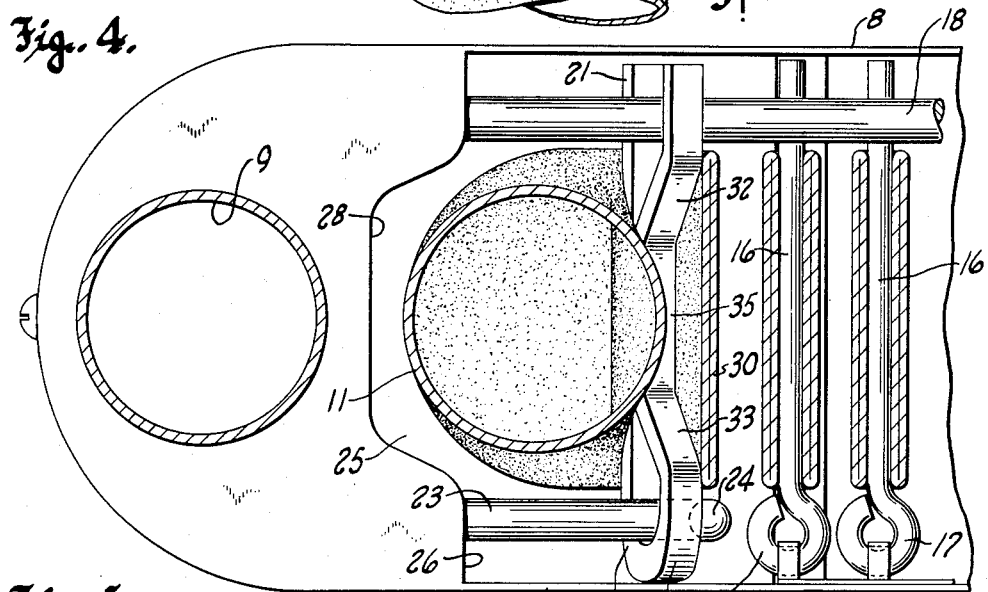
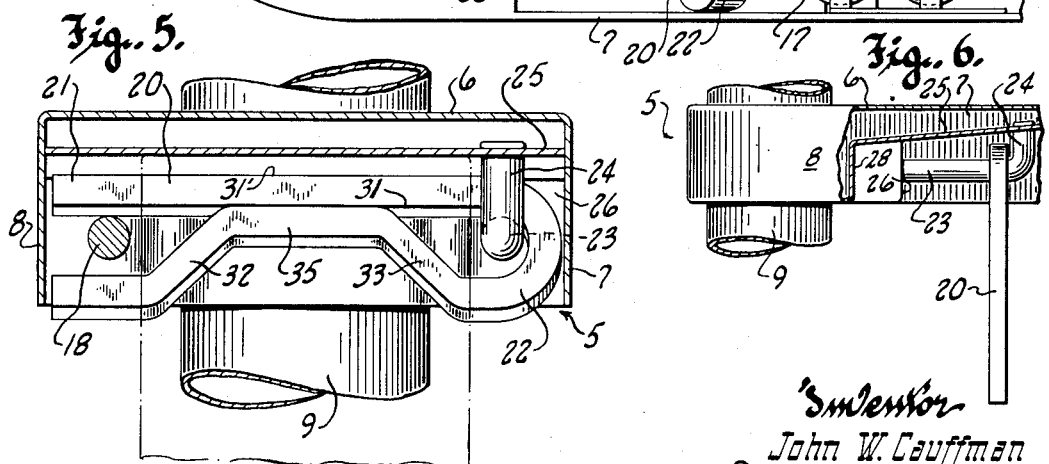
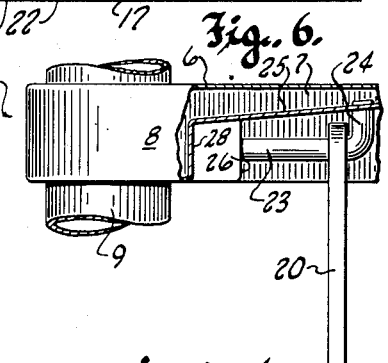
Inventor
John W. Cauffman

United States Patent Office 2,756,101
Patented July 24, 1956

2,756,101

FIRE HOSE RACK

John W. Cauffman, Elkhart, Ind., assignor to Elkhart Brass Manufacturing Company, Inc., Elkhart, Ind., a corporation of Indiana Application May 3, 1954, Serial No. 427,310

3 Claims. (Cl. 299—77)

This invention relates to fire hose racks of the semi-automatic type adapted to support a collapsed fire hose folded in serpentine fashion and to readily successively release the folds whenever a pull is exerted on the nozzle end of the hose.

In semi-automatic hose racks of this type the folds of the collapsed hose are generally supported upon a series of swivel mounted pins arranged in a row with the pins parallel and having their free ends resting upon a common supporting bar on the rack, so that when the hose is pulled in a direction crosswise of the pins, the free ends of the latter are successively slid off the supporting bar and disengaged from the folds of the hose to free the same of the rack.

In the past it has been customary to provide a special pin at the end of the row thereof adjacent to the upstream end portion of the hose, namely that end of the hose which is connected to a water supply valve. This special pin is of rectangular cross section and, while it has a function similar to the first mentioned swivel pins, can be termed a shut-off bar since it is adapted to be tilted on its axis by the upstream fold of the hose, as a result of its expansion upon the admittance of water under pressure thereto, to clamp the upstream fold of the hose between an edge on the shut-off bar and a substantially flat wall on the rack above the bar. The purpose of this is to permit the water supply valve to be opened before the hose is pulled from the rack for use, without having water under pressure flow into the successive folds of the racked-up hose in a manner which could easily cause jamming of the swivel pins and failure thereof to readily release the hose.

One type of shut-off bar previously provided for this purpose was rested upon spaced supporting rods, and had a loop at one end loosely extending around one of the rods. The bar was thus free to slide sidewise along the length of its supporting rods, between limits defined by stops on the rod encircled by the loop of the bar. Thus, with the shut-off bar in an operative tilted position clamping the upstream fold of the hose against the flat wall on the rack above the bar, the disengagement of the shut-off bar from the upstream fold of the hose entailed return of the bar to an inoperative untilted position followed by a degree of forward bodily sliding motion of the bar in the direction of pull on the hose, until the looped end of the bar engaged the forward stop of its rod to cause the free end portion of the bar to be swung in an arc off of its supporting rod by the pull on the hose. Such disengagement of the free end of the bar from its supporting rod, of course, results in downward swinging of the bar about its looped end, to a vertically depending position entirely free of the last fold of the hose, and permitting water under pressure to flow from the upstream end portion of the hose through the remainder of the hose.

While the shut-off bar used in past hose racks of this type was readily releasable to allow the hose to be withdrawn from the rack, it frequently failed to effect the desired tight shut-off of water as a consequence of expansion of the upstream fold of the hose upon admittance of water under pressure thereto. Very often the expansion of the upstream fold of the hose failed to tilt the bar toward a shut-off position until it had first caused a forward sliding movement of one end of the bar relative to the other. When this occurred, the shut-off bar could not effect tight clamping of the fold of the hose thereon against the flat wall of the rack thereabove, for this wall must be slanted upwardly and forwardly at a small angle to horizontal, sufficient to allow the shut-off bar to be moved out of its tilted operative position by a pull on the hose. Hence, if the shut-off bar was moved to a skewed position at an angle to its supporting rods other than 90° before tilting of the bar, its ends would not be equidistant from said sloping overhead wall and it was impossible to tightly clamp the hose thereagainst across the whole length of the shut-off bar. The result was that water under pressure could flow past the shut-off bar and into the remaining serpentine folds of the hose, in some cases to result in jamming of the rack and failure of the hose to be readily released therefrom by a pull exerted on the nozzle end of the hose.

With this objection in mind it is the object of the present invention to provide an improved shut-off bar for a semi-automatic fire hose rack of the character described, which bar is so constructed that expansion of the upstream fold of the hose resting thereon causes the application of equal tilting forces to the end portions of the bar and proper tilting of the bar on its axis to its operative shut-off position, without danger of having one end or the other of the bar slide forwardly before the bar is tilted.

More specifically, this invention has as its purpose to provide a semi-automatic fire hose rack with an improved shut-off bar having legs fixed to its underside and projecting downwardly therefrom to overlie the opposite marginal edge portions of the upstream fold of the hose supported on the bar so that the expanding hose presses against both legs on the bar and results in the application of equal tilting forces to the bar and rocking of the bar on its axis the slight degree necessary to effect a secure shut-off of the hose.

With the above and other objects in view which will appear as the description proceeds, this invention resides in the novel combination and arrangement of parts substantially as hereinafter described and more particularly defined by the appended claims, it being understood that such changes in the precise embodiment of the herein-disclosed invention may be made as come within the scope of the claims.

The accompanying drawings illustrate one complete example of the physical embodiment of the invention constructed in accordance with the best mode so far devised for the practical application of the principles thereof, and in which:

Figure 1 is an elevational view of a semi-automatic hose rack incorporating the shut-off bar of this invention, and showing the collapsed hose in position on the rack;

Figure 2 is an enlarged detail view of a portion of the rack shown in Figure 1, with portions thereof broken away and shown in section to better illustrate the shut-off bar of this invention;

Figure 3 is a view similar to Figure 2 but showing the shut-off bar in its tilted operative position;

Figure 4 is a bottom view of that portion of the rack shown in Figure 3;

Figure 5 is a cross sectional view taken through Figure 3 along the plane of the line 5—5; and Figure 6 is a view somewhat similar to Figure 2, on a reduced scale, and showing the position of the shut-off bar when it is released from the hose.

Referring more particularly to the accompanying drawings, in which like reference characters indicate like parts throughout the several views, the numeral 5 generally designates the body of a semi-automatic fire hose rack of a more or less conventional type. The body has an elongated inverted channel shaped cross section, as seen best in Figure 5, providing a flat top wall 6 and opposite downwardly depending side flanges 7 and 8.

A pipe nipple 9 secured to the body near one end thereof projects vertically through the body to have a water supply valve 10 threaded on its upper end, and to have the upstream end 11 of a fire hose indicated generally by the numeral 12 coupled to its lower end. At its downstream end the hose has the usual nozzle 13, and a spring clamp 14 detachably supports the nozzle on the opposite, or forward end of the rack.

The length of hose intermediate its upstream and downstream ends is folded in serpentine fashion and all of these folds, except that at its upstream end, are supported on readily releasable swivel pins 16 in a conventional manner. As seen best in Figure 4, one end of each of the pins 16 has a swivel connection 17 with the flange 7 of the body, and the free ends of the pins are supported on a common elongated rod 18 extending nearly the full length of the body.

When the nozzle end of the hose is pulled forwardly in a direction generally lengthwise of the body 5 of the rack, the pins are swung off of the rod 18 and their swivel connections 17 allow them to drop down successively out of the way of the folds of the hose to quickly release the hose from the rack.

The shut-off bar 20 of this invention normally extends straight across the body of the rack near the rear end thereof which has the water supply valve 10 mounted thereon. One end portion 21 of the bar rests upon the rod 18 and the other end portion of the bar has a loop 22 thereon very loosely encircling a shorter supporting rod 23 mounted on the body at the side thereof remote from the rod 18 and occupying a position parallel to the rod 18.

The forward end of the supporting rod 23 is turned upwardly as at 24 and fixed to a substantially flat wall portion 25 on the body which overlies the supporting rods 18 and 23 in spaced relation thereto. This wall slants upwardly and forwardly at a relatively slight angle to horizontal. The other end of the short supporting rod 23 is fixed in an upright transverse wall section 26 on the body, which may be formed as an integral part of the overhead wall 25, at the rear thereof.

As best seen in Figures 3 and 4, the rear end of the longer supporting rod 18 is also fixed in the upright wall section 26, while the intermediate portion of the wall 26, which lies between the rods 18 and 23 is offset rearwardly, as at 28, toward the pipe nipple 9, so as to accommodate the upstream fold of the hose supported on the shut-off bar 20 in the expanded condition of this fold.

From the description thus far it will be apparent that the shut-off bar is free to slide back and forth along the supporting rods 18 and 23 in a more or less unrestricted fashion, limited only by the engagement of the loop 22 with the upwardly extending leg 24 of its supporting rod, or with the upright wall section 26 at the other end of the rod 23. It will also be apparent that the free end portion 21 of the shut-off bar may swing clockwise in an arc off of its supporting rod 18, as seen in Figure 4, and when this happens the free end of the shut-off bar drops downwardly to be suspended vertically from its looped end as seen in Figure 6, entirely freeing the upstream fold 30 of the hose from the bar.

The shut-off bar is adapted to be tilted on its axis as consequence of expansion of the upstream fold of the hose whenever water under pressure is admitted thereto. The bar has a rectangular cross section, preferably square, and must be tilted in a counterclockwise direction on one edge 31 thereof by the expanding upstream fold of the hose in order to effect clamping of the fold of the hose supported on the bar between the diagonally opposite edge 31' of the bar and the overhead wall 25, as seen in Figure 3. If the bar tilts properly during intial expansion of the upstream fold 30 of the hose, without having one end or the other thereof slid forwardly along its supporting bar by the expansion of the hose, the hose will be securely shut off by the tilting of the bar.

All past types of shut-off bars which were provide for this purpose failed to positively shut off the hose for the reason that one end or the other of the bar frequently was slid forwardly along its supporting rod, away from the expanding upstream fold of the hose, so that even though the bar was thereafter tilted its displaced end portion could not properly clamp the hose against the sloping overhead wall 25 due to the upward and forward slant of the same.

The shut-off bar of this invention overcomes this objection to past devices of this type since it is provided with a pair of legs 32 and 33 fixed to its underside intermediate the ends of the bar at points inwardly of the supporting rods 18 and 23. These legs extend downwardly and outwardly from the bar, in divergent relation to one another, and while they are equispaced from the opposite ends of the bar they are also spaced from one another a distance less than the collapsed width of the fire hose, as seen best in Figure 4.

Consequently when the upstream fold 30 of the hose begins to expand upon the admittance of water under pressure thereto, the hose pushes against both legs 32 and 33 with equal force and causes tilting of the shut-off bar 20 upon the edge 31 thereof without any tendency to slide one end of the bar relative to the other along its supporting rod in the direction of upward and forward slant of the overhead wall 25. The shut-off bar thus tilts properly on its axis and effects secure clamping of the upstream fold of the hose between its uppermost corner 31' and the underside of the overhead wall 25 to effect a positive shut-off of the hose precluding the passage of water into the remaining folds of the hose in a manner which might cause jamming of the swivel pins or otherwise interfere with easy withdrawal of the hose from the rack.

As seen best in Figure 5 the shut-off bar and the legs 32 and 33 thereof on its underside may be formed from a single length of bar stock having a square cross section, the legs being joined to one another at their upper ends by an intermediate bar section 35 welded or otherwise secured to the shut-off bar, and having the lower end of leg 33 joined to the loop 22 on the bar. If desired, the lower end of the leg 32 may be bent horizontally outwardly to pass beneath the adjacent supporting rod 18 so that the weight of the shut-off bar on the supporting rods will be more evenly balanced.

From the foregoing description, together with the accompanying drawings, it will be apparent to those skilled in the art that this invention provides an improved shut-off bar for semi-automatic fire hose racks, by which a positive shut-off of the upstream fold of the hose is assured whenever water under pressure is admitted thereto.

What I claim as my invention is:

1. A semi-automatic fire hose rack of the type wherein a fire hose connectable at its upstream end with a water supply valve may be supported in serpentine flat folds, and wherein a shut-off bar having an operative horizontal position in which its ends are loosely supported on the rack, and having a substantially flat top, supports the fold of the hose nearest its upstream end, and wherein said fold of the hose is restrained against sliding lengthwise along said bar by means on the rack and is clamped tightly between an edge of said bar and a flat wall overlying the bar upon tilting of the bar on its axis by the hose as a consequence of expansion of the hose under the force of water pressure therein, to prevent the flow of water into the remainder of the hose until the shut-off bar has been moved to an inoperative position in which one end of the shut-off bar is unsupported: characterized by the provision of legs rigidly fixed to the bar and extending downwardly therefrom adjacent to but equispaced inwardly from the ends of the bar, and spaced from one another a distance less than the width of the flat folds of the hose, to normally lie between the flat folds of the hose supported on the bar, and upon which legs said fold of the hose nearest its upstream end is adapted to press as it expands under the force of water entering the same, to impart equal forces to the end portions of said bar to tilt the same on its axis and effect said clamping of the hose.

2. In a semi-automatic fire hose rack of the type having parallel supporting rods disposed in horizontal positions and spaced apart a distance to easily receive a collapsed flat fire hose edgewise therebetween, one of said rods being shorter than the other and there being stops at each end of said shorter rod, said rack having a substantially flat wall overlying said rods in spaced relation thereto: a substantially straight shut-off bar long enough to bridge the space between said rods and having end portions which normally rest freely thereon to suspend a portion of a collapsed fire hose from the rack with the hose passing flatwise thereover and its folds embracing the bar and passing edgewise between said rods to be restrained thereby against motion along the length of the bar, said bar having a rectangular cross section and having one end portion loosely looped around said shorter rod to slide freely therealong between the stops on said shorter rod, said loop providing for substantially universal swiveling motion of the bar to enable the other end thereof to be disengaged from its supporting rod to release said portion of the hose from the rack; a pair of legs fixed to the underside of the bar and projecting downwardly and outwardly therefrom in divergent relationship to one another toward the ends of the bar to lie in the plane of the bar but at an angle thereto, said legs being equidistant from the ends of the bar and spaced from one another a distance less than the width of the collapsed hose and being adapted to lie between folds of the hose to be acted upon by said portion of the hose as it expands under the force of water under pressure entering the same, to impart equal forces to the end portions of said bar to tilt the same upon its axis so that an edge of said tilted bar tightly clamps the fold of the hose thereon against said wall of the rack to prevent the flow of water from said portion of the hose into the remainder of the hose until said other end of the bar is disengaged from its supporting rod.

3. The semi-automatic hose rack set forth in claim 2, wherein the leg adjacent to the looped end of the bar is formed as an extension of the underside of said loop, and wherein the other of said legs has its lower end portion bent outwardly toward the adjacent end of the bar to provide a forked end on the bar loosely straddling said other supporting rod.

References Cited in the file of this patent

UNITED STATES PATENTS

| | | |
|---|---|---|
| 1,156,706 | Nuhring | Oct. 12, 1915 |
| 1,658,793 | Hansen | Feb. 14, 1928 |
| 1,750,964 | Nuhring | Mar. 18, 1930 |
| 1,904,063 | Lund | Apr. 18, 1933 |